(12) United States Patent
Zhao et al.

(10) Patent No.: US 12,302,324 B2
(45) Date of Patent: May 13, 2025

(54) SIDELINK TRANSMISSION RESOURCE CONFIGURATION METHOD AND SYSTEM, AND DEVICE AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 339 days.

(21) Appl. No.: 17/879,443

(22) Filed: Aug. 2, 2022

(65) Prior Publication Data

US 2022/0386346 A1 Dec. 1, 2022

Related U.S. Application Data

(63) Continuation of application No. PCT/CN2020/079025, filed on Mar. 12, 2020.

(30) Foreign Application Priority Data

Feb. 4, 2020 (WO) ................ PCT/CN2020/074293

(51) Int. Cl.
*H04W 72/20* (2023.01)
(52) U.S. Cl.
CPC ................. *H04W 72/20* (2023.01)
(58) Field of Classification Search
CPC ......... H04L 1/1854; H04L 2001/0092; H04W 72/02; H04W 72/20; H04W 72/23; H04W 92/18

See application file for complete search history.

(56) References Cited

U.S. PATENT DOCUMENTS

2016/0057718 A1 2/2016 Sorrentino et al.
2017/0164388 A1 6/2017 Sorrentino et al.
(Continued)

FOREIGN PATENT DOCUMENTS

CN 105451211 A 3/2016
CN 105940621 A 9/2016
(Continued)

OTHER PUBLICATIONS

Notice of Allowance issued in corresponding Russian application No. 2022123278, mailed Oct. 10, 2023.
(Continued)

*Primary Examiner* — Zhensheng Zhang
(74) *Attorney, Agent, or Firm* — BAYES PLLC

(57) ABSTRACT

Disclosed are a sidelink transmission resource configuration method and system, and a device and a storage medium. In the method, a terminal device can receive scheduling information from a network device, and determine a first available resource, which is not earlier than a target moment, in a resource pool to be a sidelink transmission moment, wherein the target moment is related to a time correlation parameter, and the time correlation parameter can be from the scheduling information or a terminal. According to the method, a sidelink transmission moment of a terminal can be determined, thereby making up for the defect in the prior art of there being a lack of solutions for determining a sidelink transmission moment, and improving the stability and flexibility of a sidelink transmission process.

9 Claims, 6 Drawing Sheets

(56) References Cited

U.S. PATENT DOCUMENTS

2018/0359749 A1 12/2018 Liu et al.
2019/0199496 A1* 6/2019 Qin .................. H04B 7/0617

FOREIGN PATENT DOCUMENTS

| CN | 107925493 A | 4/2018 |
|---|---|---|
| CN | 108260105 A | 7/2018 |
| CN | 108270539 A | 7/2018 |
| CN | 108811147 A | 11/2018 |
| CN | 109565853 A | 4/2019 |
| CN | 109600852 A | 4/2019 |
| CN | 109792369 A | 5/2019 |
| CN | 110381474 A | 10/2019 |
| CN | 105451211 B | 12/2019 |
| CN | 110710304 A | 1/2020 |
| EP | 3402269 A1 | 11/2018 |
| EP | 4090055 B1 | 9/2024 |
| JP | 2019126092 A | 7/2019 |
| RU | 2712434 C1 | 1/2020 |
| WO | 2017070842 A1 | 5/2017 |
| WO | 2019062784 A1 | 4/2019 |
| WO | 2019091143 A1 | 5/2019 |

OTHER PUBLICATIONS

Notice of Allowance issued in corresponding Chinese application No. 202211116810.4, mailed Oct. 13, 2023.
First Office Action issued in corresponding Japanese application No. 2022-547320, mailed Nov. 10, 2023.
Source: LG Electronics; Title: Summary of RAN1 Agreements/ Working assumptions in WI 5G V2X with NR sidelink; 3GPP TSG RAN WG1 #99 R1-1913601 Reno, USA, Nov. 18-22, 2019.
Source: Samsung; Title: On Resource Allocation for NR V2X Mode 1 3GPP TSG RAN WG1 #97 R1-1906935 Reno, USA, May 13-17, 2019.
3GPP TS 36.213 V16.0.0 (Dec. 2019); Technical Specification Group Radio Access Network; Evolved Universal Terrestrial Radio Access (E-UTRA); Physical layer procedures(Release16).
Extended European Search Report issued in corresponding European application No. 20918115.5, mailed May 26, 2023.
First Office Action issued in corresponding Russian application No. 2022123278, mailed Jun. 30, 2023.
First Office Action issued in corresponding Chinese application No. 202211116810.4, mailed Jul. 29, 2023.
Vivo, "Discussion on mode 1 resource allocation mechanism", R1-1912021, 3GPP TSG RAN WG1 Meeting #99 Reno, USA, Nov. 18-22, 2019.
Ericsson, "Feature lead summary# 2 on Resource allocation for NR sidelink Mode 1", R1-1913547, 3GPP TSG-RAN WG1 Meeting #99 Chongqing, China, Nov. 18-22, 2019.
Ericsson, "Uu-based sidelink resource allocation", R1-1912598, 3GPP TSG-RAN WG1 Meeting #99 Reno, NV, US 18-22, 2019.
International Search Report issued in International Application No. PCT/CN2020/074293, mailed Nov. 10, 2020.
Written Opinion of the International Searching Authority issued in International Application No. PCT/CN2020/074293, mailed Nov. 10, 2020.
International Search Report issued in International Application No. PCT/CN2020/079025, mailed Nov. 12, 2020.
Written Opinion of the International Searching Authority issued in International Application No. PCT/CN2020/079025, mailed Nov. 12, 2020.
"Feature lead summary for AI 7.2.4.7: NR control for LTE sidelink", R1-1907801, Source: Huawei, 3GPP TSG RAN WG1 Meeting #97, Reno, USA, May 13-17, 2019.
"Draft Report of 3GPP TSG RAN WG1 #99 v0.1.0", R1-20xxxxx, Source: MCC Support, 3GPP TSG RAN WG1 Meeting #100, Athens, Greece, Feb. 24-28, 2020.
"LTE sidelink communication under NR Uu control", R1-1912210, Source: Intel Corporation, 3GPP TSG RAN WG1 #99, Reno, USA, Nov. 18-22, 2019.
"Discussion on Ethernet Header Compression", R2-1912210, Source: CATT, 3GPP TSG-RAN WG2 Meeting #107bis, Chongqing, P. R. China, Oct. 14-18, 2019.
3GPP TS 36.211 V15.3.0 (Sep. 2018); Technical Specification Group Radio Access Network; Evolved Universal Terrestrial Radio Access (E-UTRA); Physical channels and modulation (Release 15).
3GPP TS 38.211 V15.4.0 (Dec. 2018); Technical Specification Group Radio Access Network; NR; Physical channels and modulation (Release 15).
Decision of Refusal issued in corresponding Japanese Application No. 2022-547320, mailed on Jul. 23, 2024, 15 pages.
First Office Action issued in corresponding Vietnamese Application No. 1-2022-05027, mailed Sep. 9, 2024, 4 pages.
Extended European Search Report issued in corresponding European Application No. 24187034.4, mailed on Oct. 10, 2024, 10 pages.
International Preliminary Report on Patentability issued in corresponding International Application PCT/CN2020/079025, issued on Jul. 28, 2022, 9 pages.

* cited by examiner

SIDELINK TRANSMISSION RESOURCE CONFIGURATION METHOD AND SYSTEM, AND DEVICE AND STORAGE MEDIUM

CROSS-REFERENCE TO RELATED APPLICATIONS

This application is a continuation of International Application No. PCT/CN2020/079025, filed on Mar. 12, 2020, which claims the benefit of priority to International Application No. PCT/CN2020/074293 filed on Feb. 4, 2020, entitled "SIDELINK TRANSMISSION RESOURCE CONFIGURATION METHOD AND SYSTEM, AND DEVICE AND STORAGE MEDIUM", the contents of which are hereby incorporated by reference in their entireties.

TECHNICAL FIELD

Embodiments of this application relate to communication technologies, and in particular, to a method and a system for configuring sidelink transmission resource, as well as a device and a storage medium.

BACKGROUND

The Internet of vehicles (IoV) system can be realized through sidelink (SL) transmission technology. Compared with traditional cellular networks, SL transmission adopts end-to-end direct communication, which has lower transmission delay and higher spectrum efficiency.

The SL transmission technology supports the resource allocation manners of mode A and mode B specified in the 3rd generation partnership project (3GPP) protocol. In other words, the terminal may autonomously select transmission resources in the resource pool for SL transmission (mode B); or, the terminal may also perform SL resource transmission on the resources allocated by the base station (mode A). When performing SL transmission in mode A, the base station may allocate SL transmission resources to the terminal in a dynamic scheduling manner. Alternatively, the base station may also allocate SL configured grant (CG) transmission resources to the terminal. Resource allocation manners of the SL CG includes type-1 CG and type-2 CG. In the related art, it is agreed that, for the network scheduling of dynamic scheduling and type-2 SL CG, the SL transmission timepoint is determined by the terminal.

However, for the SL transmission of type-1 SL CG and SL transmission achieved by means of cross-radio access technology (cross-RAT), there is still no agreement for determining the SL transmission timepoint.

SUMMARY

The embodiments of this application provide a method, a system, a device, and a storage medium for configuring SL transmission resources to determine the SL transmission timepoint of a terminal, thereby overcoming the deficiency of determining the SL transmission timepoint in the related art, as well as improving stability and flexibility of the transmission procedure.

According to a first aspect, the embodiments of this application provide a method for configuring SL transmission resource, which is applied to a terminal, and includes:
receiving scheduling information from a network device, where the scheduling information is used for configuring the SL transmission resource of the terminal; and
obtaining a start timepoint of a SL transmission of the terminal, where the start timepoint is a first one available resource in a resource pool not earlier than a target timepoint;
where the target timepoint is associated with a time-related parameter, and the time-related parameter is derived from the terminal or is determined according to the scheduling information.

According to a second aspect, the embodiments of this application provide a method for configuring SL transmission resource, which is applied to a network device, and includes:
determining scheduling information of a terminal, where the scheduling information is used for configuring the SL transmission resource of the terminal; and
sending the scheduling information to the terminal, causing the terminal to obtain a start timepoint of a SL transmission of the terminal, where the start timepoint is a first one available resource in a resource pool not earlier than a target timepoint;
where the target timepoint is associated with a time-related parameter, and the time-related parameter is derived from the terminal or is determined according to the scheduling information.

According to a third aspect, the embodiments of this application provide a terminal device, including:
a transceiving module, configured to receive scheduling information from a network device, where the scheduling information is used for configuring a SL transmission resource of the terminal device; and
a processing module, configured to obtain a start timepoint of a SL transmission of the terminal device, where the start timepoint is a first one available resource in a resource pool not earlier than a target timepoint;
where the target timepoint is associated with a time-related parameter, and the time-related parameter is derived from the terminal device or is determined according to the scheduling information.

According to a fourth aspect, the embodiments of this application provide a network device, including:
a processing module, configured to determine scheduling information of a terminal, where the scheduling information is used for configuring the SL transmission resource of the terminal; and
a transceiving module, configured to send the scheduling information to the terminal, causing the terminal to obtain a start timepoint of a SL transmission of the terminal, where the start timepoint is a first one available resource in a resource pool not earlier than a target timepoint;
where the target timepoint is associated with a time-related parameter, and the time-related parameter is derived from the terminal or is determined according to the scheduling information.

According to a fifth aspect, the embodiments of this application provide a terminal device, including:
a processor, a memory and a transceiver; where,
the memory stores computer-executable instructions; and
the processor is configured to, through executing the computer-executable instructions stored in the memory, implement the method according to the first aspect.

According to a sixth aspect, the embodiments of this application provide a network device, including:
a processor, a memory and a transceiver; where,
the memory stores computer-executable instructions; and the processor is configured to, through executing the computer-executable instructions stored in the memory, implement the method according to the second aspect.

According to a seventh aspect, the embodiments of this application provide a communication system, including:

a terminal device, configured to execute the method described in the first aspect; and a network device, configured to execute the method described in the second aspect.

According to an eighth aspect, the embodiments of this application provide a computer-readable storage medium having computer-executable instructions stored therein, and the computer-executable instructions are used for, when being executed by a processor, implementing the method according to the first aspect or the second aspect.

According to a ninth aspect, the embodiments of this application provide a chip, including: a processor, configured to call and run a computer program from a memory, thereby causing a device installed with the chip to execute the method according to the first aspect or the second aspect.

According to a tenth aspect, the embodiments of this application provide a computer program product, including computer program instructions, which cause a computer to execute the method according to the first aspect or the second aspect.

According to an eleventh aspect, the embodiments of this application provide a computer program that enables a computer to execute the method according to the first aspect or the second aspect.

Based on the method, system, device, and storage medium for configuring SL transmission resource according to the embodiments of this application, the terminal device receives scheduling information from the network device, and the scheduling information is used for scheduling the SL transmission resource of the terminal device. In some embodiments of this application, the scheduling information is sent by the network device in the type-1 mode, or sent by the network device based on the cross-RAT. The terminal device may obtain a target timepoint associated with a time-related parameter according to the scheduling information or the time-related parameter of the terminal as pre-configured, so as to select the first one available resource not earlier than the target timepoint in the resource pool as the SL transmission timepoint (that is, the start timepoint of SL transmission). In this way, based on the technical solution according to the embodiments of this application, the SL transmission timepoint can be determined for the scheduling information sent by the network according to type-1 mode or cross-RAT, thereby overcoming the deficiency of determining the SL transmission timepoint in the related art, as well as improving stability and flexibility of the transmission procedure.

BRIEF DESCRIPTION OF THE DRAWINGS

In order to more clearly describe the technical solutions in the embodiments of this application or the related art, the following will briefly introduce the drawings to be used in the description of the embodiments or the related art. Obviously, the drawings in the following description illustrate merely some examples of this application. For those of ordinary skill in the art, other drawings can be obtained based on these drawings without creative labor.

DETAILED DESCRIPTION

In order to make the purpose, technical solutions and advantages of the embodiments of this application clearer, the technical solutions according to some examples of this application will be described clearly and completely with reference to the accompanying drawings according to some examples of this application. Obviously, the described examples are merely a part of examples of this application, but not all of the examples. Based on the examples of this application, all other examples obtained by those of ordinary skill in the art without creative work shall fall within the protection scope of this application.

The terms "first", "second", and the like in the description, claims, and the above-mentioned drawings according to some examples of this application are used for distinguishing similar objects, and are not necessarily used for describing a specific order or sequence. It should be understood that the data described in this way may be interchanged under appropriate circumstances, so that the examples of this application described herein may be implemented in a sequence other than those illustrated or described herein. In addition, the terms "including" and "having" and any variations thereof are intended to cover non-exclusive inclusions. For example, the process, method, system, product, or device that includes a series of steps or units is not necessarily limited to include those clearly listed, but may include other steps or units that are not clearly listed or are inherent to the process, method, system, product, or device.

The technical solutions according to some examples of this application will be described below with reference to the drawings according to some examples of this application. Obviously, the described examples are part of the examples of this application, rather than all of the examples. Based on the examples in this application, all other examples obtained by those of ordinary skill in the art without creative work shall fall within the protection scope of this application.

The technical solutions according to some examples of this application may be applied to various end-to-end communication systems, for example, device to device (D2D) system, vehicle to vehicle (V2V) system, vehicle to everything (V2X) communication system, machine to machine (M2M) communication, machine type communication (MTC), and the like.

Figure 1:
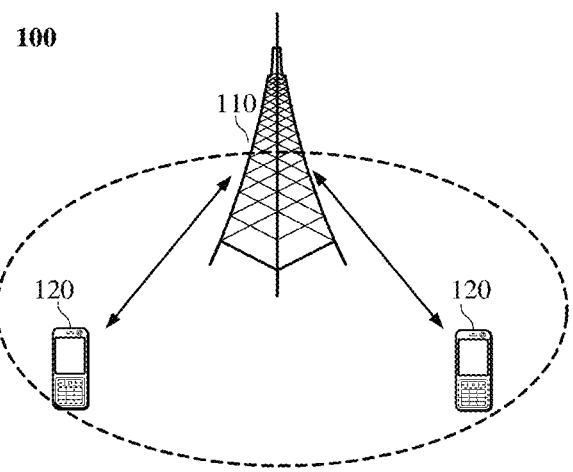
FIG. 1 is a schematic diagram of a communication system according to this application.

Exemplarily, the communication system 100 applied in some examples of this application is shown in FIG. 1. The communication system 100 includes a network device 110, and the network device 110 may be a device that communicates with a terminal device 120 (or referred to as a communication terminal or terminal). The network device 110 may provide communication coverage for a specific geographic area, and may communicate with terminal devices located within the coverage area. Optionally, the network device 110 may be a base transceiver station (BTS) in a GSM system or a CDMA system, a NodeB (NB) in a WCDMA system, an evolutional Node B (eNB or eNodeB) in an LTE system, or a wireless controller in a cloud radio access network (CRAN). Alternatively, the network device may be a mobile switching center, a relay station, an access point, a vehicle-mounted device, a wearable device, a hub, a switch, a bridge, a router, a network side device in 5G networks, a network device in the future evolution of public land mobile network (PLMN), and the like.

The communication system 100 also includes at least one terminal device 120 located within the coverage area of the network device 110. The "terminal device" used here includes but is not limited to a device implemented based on a connection via wired lines, such as via public switched telephone networks (PSTN), digital subscriber line (DSL), digital cable, and direct cable connection; and/or via another data connection/network; and/or via a wireless interface, such as cellular networks, WLAN, digital TV networks (e.g., DVB-H networks), satellite networks, AM-FM broadcast transmitters; and/or via another terminal device that is configured to receive/send communication signals; and/or via Internet of things (IoT) devices. The terminal device configured to communicate through a wireless interface may be referred to as a "wireless communication terminal", a "wireless terminal" or a "mobile terminal". Examples of mobile terminals include, but are not limited to, a satellite or cellular phone; a personal communications system (PCS) terminal that combines cellular radio phone function with data processing, fax, and data communication capabilities; a personal digital assistant (PDA) device integrated with functions of radio phone, pager, Internet/intranet access, web browser, notebook, calendar, and/or global positioning system (GPS) receiver; and regular laptop and/or palmtop receiver or other electronic device including a radio telephone transceiver. The terminal device may also be referred to as access terminal, user equipment (UE), user unit, user station, mobile station, mobile site, remote station, remote terminal, mobile equipment, user terminal, terminal, wireless communication equipment, user agent, or user device. The access terminal may be a cellular phone, a cordless phone, a session initiation protocol (SIP) phone, a wireless local loop (WLL) station, a PDA device, a handheld device with wireless communication function, a computing device or other processing device connected to a wireless modem, an in-vehicle device, a wearable device, a terminal device in the 5G network, a terminal device in a future evolution of the PLMN, or the like.

According to some examples of this application, the terminal devices in the communication system may perform SL transmission therebetween. Compared with the traditional cellular system in which communication data is received or sent through a base station, SL transmission is a direct terminal-to-terminal communication method, which has higher spectrum efficiency and lower transmission delay.

Currently, two SL transmission modes, Mode A and Mode B, are defined in the 3GPP protocol.

Figure 2A:
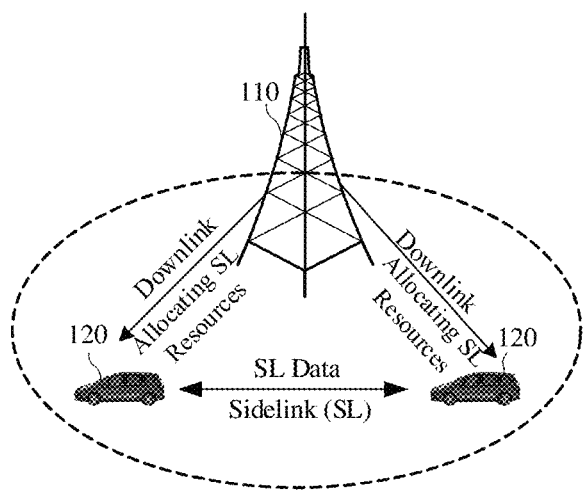
FIG. 2A is a schematic diagram of implementing SL transmission in mode A in the D2D system according to some examples of this application.

Exemplarily, FIG. 2A shows a schematic diagram of implementing SL transmission in mode A in a D2D system. As shown in FIG. 2A, the network device 110 allocates SL transmission resources to the terminal device 120 on the downlink (DL), so that data transmission between the terminal devices 120 may be performed on the SL. Further, the network device may allocate a single transmission resource to the terminal device, or may allocate a semi-static transmission resource to the terminal. How the network device allocates resources for the terminal will be described in detail later.

Figure 2B:
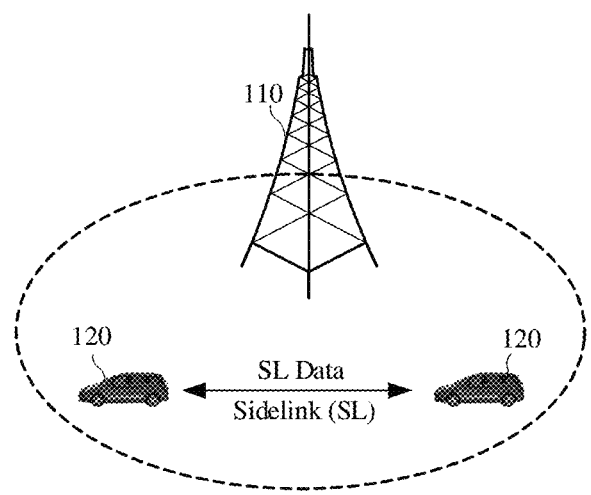
FIG. 2B is a schematic diagram of implementing SL transmission in mode B in the D2D system according to some examples of this application.

Exemplarily, FIG. 2B shows a schematic diagram of implementing SL transmission in mode B in a D2D system. As shown in FIG. 2B, in mode B, the terminal device 120 selects a resource from the resource pool to transmit SL data. The selection manner of the terminal device is not detailed here.

The V2X system may use an end-to-end communication system for communication, which makes the V2X system have higher throughput, lower delay, higher reliability, larger coverage, more flexible resource allocation, and so on. In other words, the aforementioned communication system may be a V2X system, and the terminal may be a vehicle-mounted terminal.

Specifically, the aforementioned communication system applied in this application, for example, a V2X system, may be an NR-V2X system based on a new radio (NR) network; or, may also be an LTE-V2X system based on LTE network.

Now, taking the NR-V2X system as an example, the SL transmission resource allocation mode of mode A shown in FIG. 2A will be described. Specifically, the network device implements the SL transmission resource allocation by dynamically scheduling the SL resources, or allocate SL configured grant (SL CG) transmission resources to the terminal.

Specifically, in the NR-V2X system, the network device may allocate SL transmission resources to the terminal in a dynamic scheduling manner. In other words, the network device allocates resources for a single transmission to the terminal. When the terminal device needs to perform multiple SL transmissions, the network device may allocate resources for each SL transmission separately through the dynamic scheduling manner.

Alternatively, in an end-to-end communication system, such as the NR-V2X system, the network device may allocate a SL CG transmission resource for the terminal. Typically, it mainly includes but is not limited to two configured grant modes: type-1 configured grant (the first type of configured grant, hereinafter referred to as type-1)

and type-2 configured grant (the second type of configured grant, hereinafter referred to as type-2). Moreover, for ease of description, the SL transmission scheme implemented based on type-1 configured grant is referred to as type-1 scheduling scheme; and the SL transmission scheme implemented based on type-2 configured grant is referred to as type-2 scheduling scheme.

In the type-1 scheduling scheme, the network device configures SL transmission resources for the terminal through radio resource control (RRC) signaling. In other words, RRC signaling is used for configuring the SL transmission resources of the terminal. The transmission parameters (also referred to as resource configuration parameters, SL configuration parameters, or the like) carried in RRC signaling may include, but are not limited to, all transmission resources and transmission parameters including time domain resources, frequency domain resources, demodulation reference signal (DMRS), modulation and coding scheme (MCS), and the like.

Therefore, when performing SL transmission, the network device sends RRC signaling to the terminal. After receiving the RRC signaling, the terminal uses the configuration parameters carried in the RRC signaling to determine the time-frequency resources (time domain resources and frequency domain resources), and then performs SL transmission on the time-frequency resources.

In the type-2 scheduling scheme, the network device adopts two configuration steps to implement SL resource configuration. Typically, the network device implements SL resource configuration based on RRC signaling and downlink control information (DCI). In other words, both RRC signaling and DCI are used for configuring the SL transmission resources of the terminal. Specifically, RRC signaling is used for configuring part of SL transmission resource information; and DCI is used for configuring another part of SL transmission resource information, and is used for activating the SL transmission. Herein, RRC signaling may be used for configuring transmission resources and transmission parameters including: time-frequency resource cycle, redundancy version, number of retransmissions, HARQ processes, and the like; while the DCI may be used for configuring other transmission resources and transmission parameters including: time-domain resources, frequency domain resources, MCS, and the like, and the DCI is further used for activating the transmission of the second type of configured grant.

When the type-2SL resource configured grant is implemented, the terminal, upon receiving RRC signaling, cannot immediately use the SL configuration resources and parameters for SL transmission, but needs to wait for the corresponding DCI to configure other resources and transmissions, and can only perform the SL transmission after the activation.

In addition, in the type-2 scheduling scheme, DCI may also be used to deactivate SL transmission. In other words, the network device sends DCI to the terminal, and the DCI is used for deactivating the SL transmission. After receiving the DCI used for deactivating the SL transmission, the terminal can no longer use the SL transmission resources indicated by the DCI for SL transmission.

During the SL transmission process, the network device may allocate the SL transmission resources to the terminal in any of the foregoing methods. Therefore, when the terminal transmits SL data, it can directly use the allocated SL transmission resources (not deactivated) for SL data transmission. In this process, the terminal does not need to send an SR or BSR request to the network device, thereby avoiding the corresponding delay, and reducing the delay of the SL transmission process.

In addition, NR-V2X also supports a resource scheduling scheme based on the cross radio access technology (cross-RAT), which is hereinafter referred to as the cross-RAT scheduling scheme.

In the cross-RAT scheduling scheme, RAT may be implemented between the network device and the terminal through the NR technology, while the SL transmission may be implemented based on the LTE technology.

Figure 3:
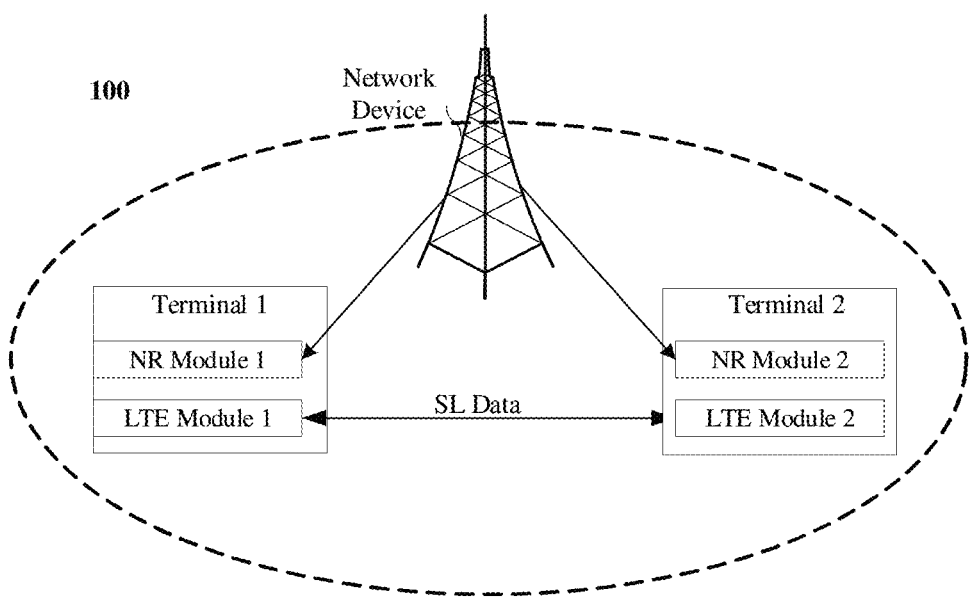
FIG. 3 is a schematic diagram of another communication system according to this application.

Exemplarily, FIG. 3 shows a schematic diagram of a communication system in such scenario. As shown in FIG. 3, in the communication system, the network device is an NR network device. For example, the network device may be a gNB base station. The terminal may include an NR module and an LTE module. Herein, the terminal may communicate with the network device through the NR module (specifically, for example, the NR Uu interface in the NR module), and implement SL transmission through the LTE module. Exemplarily, as shown in FIG. 3, the terminal 1 communicates with the network device through the NR module 1, and the terminal 1 performs SL data transmission with the LTE module 2 of the terminal 2 through the LTE module 1.

In the implementation shown in FIG. 3, the network device controls (or schedules) the SL of LTE through the NR Uu interface. Specifically, the SL transmission resource scheduled by the network device is LTE SL transmission resource. Exemplarily, the LTE SL transmission resources may include: LTE physical sidelink control channel (PSCCH) or physical sidelink shared channel (PSSCH).

In specific implementation, the network device may configure and schedule the SL transmission resources of the terminal through the mode of "RRC signaling+DCI". In other words, the network device configures semi-static transmission resources for the terminal through RRC signaling, and activates the semi-static transmission resources through DCI.

When the network device allocates SL transmission resources to the terminal, the network device may allocate periodic transmission resources to the terminal. Moreover, in each cycle, multiple transmission resources may be configured.

Figure 4:
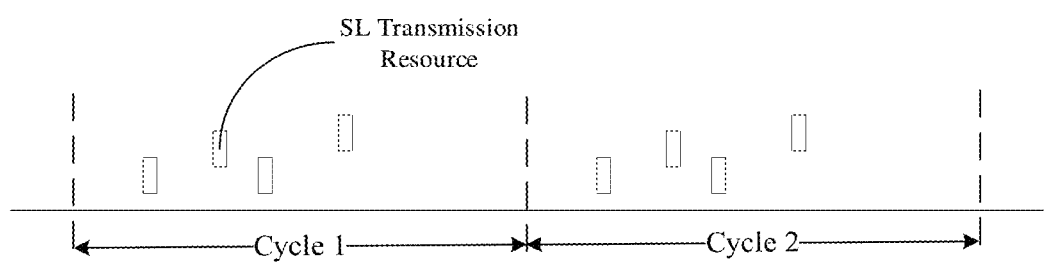
FIG. 4 is a schematic diagram of a SL transmission resource allocated to a terminal by a network device according to some examples of the application.

Exemplarily, FIG. 4 shows a schematic diagram of a SL transmission resource allocated by a network device to a terminal. As shown in FIG. 4, FIG. 4 shows the resource allocation in 2 cycles; each cycle includes 4 SL transmission resources, and the positions of the 4 SL transmission resources in the respective cycles are the same. In other words, the network device allocates periodically repeated SL transmission resources to the terminal.

Figure 5:
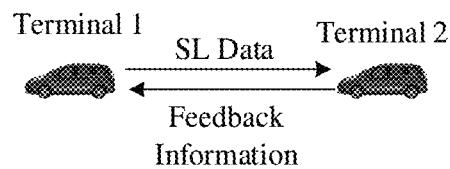
FIG. 5 is a schematic diagram of a SL transmission link and a feedback channel between terminals according to some examples of the application.

Further, in the NR-V2X system, a feedback channel may also be introduced on the basis of SL transmission. Exemplarily, FIG. 5 shows a schematic diagram of a SL transmission link and a feedback channel between terminals. As shown in FIG. 5, terminal 1 (sending end terminal) sends SL data to terminal 2 (receiving end terminal) through the SL transmission link, and terminal 2 sends SL feedback information (also referred to as feedback information) to terminal 1 through the feedback channel. The feedback information may include: ACK (also referred to as SL HARQ ACK, HARQ ACK), which is used for indicating that SL data has been successfully received; or, NACK (also referred to as SL HARQ NACK, HARQ NACK), which is used for indicating that SL data has not been received.

According to some examples shown in FIG. 5, after the terminal 1 sends the SL data to the terminal 2, it may also receive feedback information from the terminal 2. Therefore, the terminal 1 may also determine whether the SL data needs to be retransmitted based on the feedback information. Exemplarily, if the terminal 1 receives a NACK, it resends the SL data (retransmission) to the terminal 2; on the contrary, if the terminal 1 receives an ACK, there is no need for retransmission.

In addition, when the feedback channel of the SL transmission is activated, after receiving the feedback information, the sending end terminal may also report the feedback information of the SL to the network device. In this way, after receiving the feedback information, the network device may determine, based on the feedback information, whether it is necessary to re-allocate SL transmission resources for the terminal. Exemplarily, if the feedback information indicates that SL data has not been received, the network device re-allocates SL transmission resources to the terminal; conversely, if the feedback information indicates that SL data has been received, the network device does not need to re-allocate SL data to the terminal, and discards the feedback information.

In an end-to-end communication system, such as the LTE-V2X system, when end-to-end SL transmission is performed between terminals, it is possible but not limited to adopt any one of unicast, multicast, and broadcast to implement SL transmission.

Figure 6A:
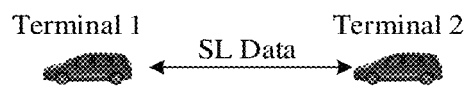
FIG. 6A is a schematic diagram of SL transmission in a unicast manner according to some examples of the application.
Figure 6B:
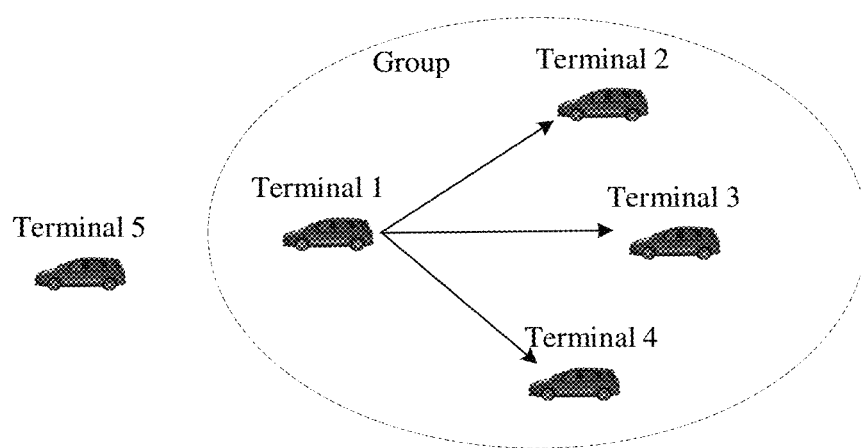
FIG. 6B is a schematic diagram of SL transmission in a multicast manner according to some examples of the application.
Figure 6C:
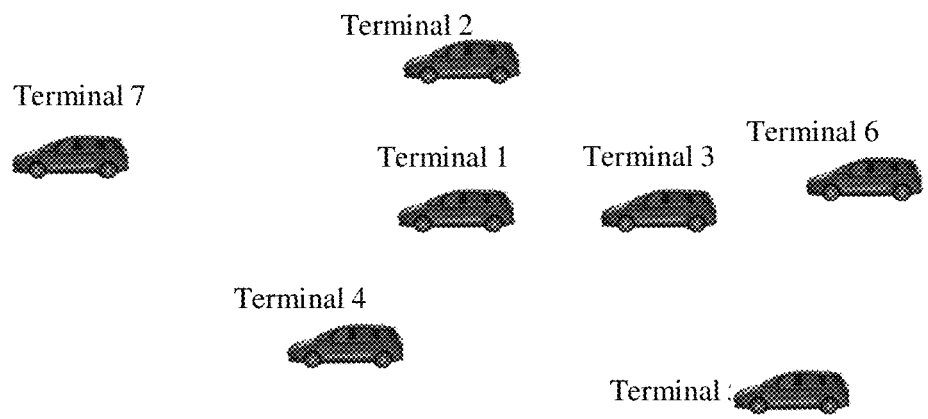
FIG. 6C is a schematic diagram of SL transmission in a broadcast manner according to some examples of the application.

Exemplarily, FIG. 6A to FIG. 6C are schematic diagrams of three SL transmission manners: unicast, multicast, and broadcast, respectively.

According to some examples shown in FIG. 6A, the SL data transmission may be performed between the terminal 1 and the terminal 2 in the unicast manner.

For the multicast manner, the sending end terminal can send SL data to multiple receiving end terminals at the same time. Herein, the receiving end terminal may include all terminals in a communication group, or may also include all terminals within a certain transmission distance. According to some examples shown in FIG. 6B, the terminals 1 to 4 are in the same group, and the terminal 5 does not belong to the group. In this case, the terminal 1 may send SL data to the terminals 2 to 4 in the multicast manner.

For the broadcast manner, the sending end terminal may broadcast SL data and, accordingly, the receiving end terminal may be any terminal. For any receiving end terminal, it may listen to the broadcast or not. According to some examples shown in FIG. 6C, the communication system includes terminal 1 to terminal 7 (there is no restriction on the network device here). Accordingly, terminal 1 may broadcast SL data, and terminal 2 to terminal 7 may serve as the receiving end terminal of the SL data.

Based on the different SL transmission manners as described above, the implementation manner for the foregoing feedback channel may also be different.

In some examples, for a system that adopts the broadcast manner for SL transmission, there is no need for the receiving end terminal to feedback its reception situation. In this case, there is no need to provide a feedback channel.

In some other examples, as shown in FIG. 5, for a system that adopts the unicast manner (or multicast manner) for SL transmission, a feedback channel may be provided, and the receiving end terminal sends feedback information through the feedback channel, thereby improving the reliability of the communication system.

In some other examples, in the foregoing broadcast, multicast, or unicast manner, the SL data sent by the sending end terminal to the receiving end terminal may also carry SL control information (SCI). Herein, the SCI is used for indicating the transmission resources and parameters of the SL data channel PSSCH, and the SCI may include indication information, which is used for indicating whether the receiving end needs to perform SL feedback.

When implementing SL transmission in mode A, based on the SL transmission resources configured by the network device, the terminal also needs to determine the SL transmission timepoint when performing SL transmission, that is, the start timepoint for starting SL data transmission.

Exemplarily, in the LTE-V2X system, SL transmission is supported based on the SL transmission resources allocated by the network device, which includes the SL transmission resources that are dynamically scheduled or semi-statically scheduled by the network device.

According to some examples, the network device may dynamically schedule SL transmission through DCI. Accordingly, the SL transmission time obtained by the terminal is the first one SL transmission resource that is not earlier than a first timepoint. Herein, the first timepoint satisfies the following formula:

$$T_1 = T_{DL} - \frac{N_{TA}}{2} \times T_S + (4 + m) \times 10^{-3}$$

Herein, $T_1$ is the first timepoint, $T_{DL}$ is a start timepoint of the downlink slot, $N_{TA}$ is the number of time units obtained according to the timing advance (TA), $T_S$ is the time unit, and m is the slot offset.

In some examples, $T_{DL}$ is the start timepoint of the downlink slot where the DCI is located.

In some other examples, the network device may configure the semi-static SL transmission parameters of the terminal through RRC signaling, and configure other parameters as well as activate the semi-static transmission through DCI. Accordingly, the SL transmission timepoint obtained by the terminal is the first one SL transmission resource not earlier than a second timepoint. Herein, the second timepoint satisfies the following formula:

$$T_2 = T_{DL} - \frac{N_{TA}}{2} \times T_S + (4 + m) \times 10^{-3}$$

Herein, $T_2$ is the second timepoint, $T_{DL}$ is a start timepoint of the downlink slot, $N_{TA}$ is the number of time units obtained according to the timing advance (TA), $T_S$ is the time unit, and m is the slot offset.

In some examples, $T_{DL}$ is the start timepoint of the downlink slot where the DCI is located.

Exemplarily, the NR-V2X system also supports SL transmission based on the SL transmission resources allocated by the network device, which includes: SL transmission resources dynamically scheduled or configured grant scheduled by the network device. There are two types of configured grant scheduling: type-1 and type-2, which are not repeated here.

The existing protocol defines that, when the NR-V2X system implements SL configured grant in the type-2 mode, the SL transmission timepoint obtained by the terminal is the first one SL transmission resource not earlier than a third timepoint. Herein, the third timepoint satisfies the following formula:

$$T_3 = T_{DL} - \frac{T_{TA}}{2} \times T_C + m \times T_{slot}$$

Herein, $T_3$ is the third timepoint, $T_{DL}$ is a start timepoint of the downlink slot, $T_{TA}$ is a duration obtained according to the timing advance $T_A$, $T_C$ is a preset parameter, m is the slot offset, and $T_{slot}$ is the unit slot duration of SL transmission.

Alternatively, in some examples, the third timepoint in the scenario may also satisfy the following formula:

$$T_3 = T_{DL} - \frac{T_{TA}}{2} + m \times T_{slot}$$

Herein, $T_3$ is the third timepoint, $T_{DL}$ is a start timepoint of the downlink slot, $T_{TA}$ is a duration obtained according to the timing advance TA, m is the slot offset, and $T_{slot}$ is the unit slot duration of SL transmission. In some examples, there is no need to consider the influence of the preset parameter $T_C$.

According to some examples of the type-2 scheduling scheme, $T_{DL}$ is the start timepoint of the downlink slot where the DCI is located.

In summary, for dynamic scheduling and type-2 scheduling schemes, a way is provided in related art to determine the SL transmission timepoint. However, for the type-1 scheduling scheme and cross-RAT scheduling scheme, how does the terminal determine the SL transmission timepoint has not yet been determined in the art.

In order to solve the foregoing shortcomings in the related art, some examples provide a method for configuring SL transmission resources. The method for configuring SL transmission resources is described below with reference to some specific examples.

Figure 7:
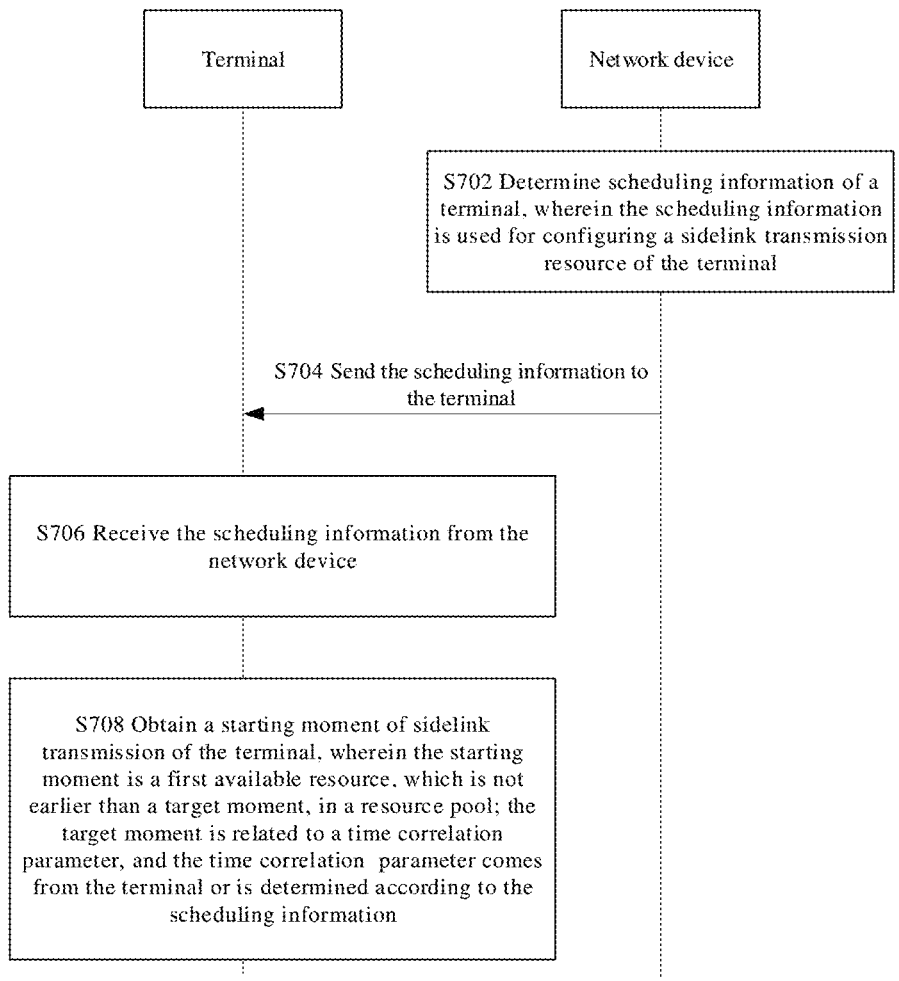
FIG. 7 is a schematic interaction flow chart of a method for configuring SL transmission resource according to some examples of the application.

Exemplarily, FIG. 7 shows a schematic interaction flow chart of a method for configuring SL transmission resources according to some examples of this application. As shown in FIG. 7, the method includes the following steps.

In S702, the network device determines scheduling information of the terminal, and the scheduling information is used for configuring the SL transmission resources of the terminal.

According to some examples of this application, the scheduling information may include, but is not limited to, RRC signaling; or DCI; or RRC signaling and DCI.

Exemplarily, in the type-1 scheduling scheme, RRC signaling is used for configuring the first type (that is, type-1) SL configured grant. In this scenario, the scheduling information may be RRC signaling.

Exemplarily, in the cross-RAT scheduling scheme, RRC signaling is used for configuring part of SL transmission resource information, and DCI is used for configuring SL transmission resources, as well as activating the SL transmission resources. In this scenario, the scheduling information may be DCI.

In S704, the network device sends the scheduling information to the terminal.

In the NR communication system, communication between the network device and terminal can be implemented based on NR technology. Specifically, communication can be implemented based on the NR module or NR Uu interface in the terminal.

In the LTE communication system, communication between the network device and terminal can be implemented based on LTE technology. Specifically, the communication can be implemented based on the LTE module or LTE Uu interface in the terminal.

In S706, the terminal receives the scheduling information from the network device.

In S708, the terminal obtains the start timepoint of SL transmission of the terminal. The start timepoint is the first one available resource in the resource pool not earlier than a target timepoint; where the target timepoint is associated with a time-related parameter, and the time-related parameter is derived from the terminal or is determined according to the scheduling information.

The "available resource" described in some examples of this application refer to a SL transmission resource allocated (or configured grant) by the network device from the resource pool for the terminal. This will be further explained in conjunction with specific scenarios here below.

Based on different scheduling schemes and different scheduling information, the time-related parameter carried in the scheduling information may also be different; and the time-related parameter stored in the terminal may also be different.

In the following, the type-1 scheduling scheme and the cross-RAT scheduling scheme are respectively described.

In the type-1 scheduling scheme, the scheduling information is RRC signaling. In this scenario, the time-related parameter includes a delay parameter, and the delay parameter is used for indicating a first duration. For the convenience of description, the delay parameter is denoted as Y. The delay parameter Y will be described in detail later.

In some examples, the target timepoint is associated with the delay parameter Y, the first timepoint, and the timing advance TA, where the first timepoint can be determined according to the RRC signaling (scheduling information).

According to some examples of this application, based on the RRC signaling, the first timepoint can be determined in at least the following manners.

In some examples, the first timepoint is determined according to the slot in which the RRC signaling is located. Exemplarily, the first timepoint may be specifically the start timepoint of the downlink transmission slot where the RRC signaling is located.

It should be noted that, in some examples, the downlink slot where the RRC signaling is located may be the downlink slot where the RRC signaling is transmitted for the first time; or, it may be the downlink slot where the RRC signaling is transmitted for the last time; or, it may be a slot in which the terminal device confirms that the RRC signaling is correctly received; or, it may be a slot in which the RRC signaling is correctly received.

For example, when the RRC signaling is the configuration signaling of the SL configured grant sent by the network device to the terminal, the RRC signaling is carried in the downlink physical shared channel (PDSCH), and the terminal sends a receipt feedback (ACK or NACK) to the network according to a detection result of the PDSCH, where the receipt feedback is used for indicating whether the terminal correctly receives the RRC signaling. Specifically, if the terminal device successfully receives the scheduling information from the network device, the terminal device sends an ACK to the network device to notify the network device that the scheduling information has been successfully received. Conversely, if the terminal does not successfully receive the scheduling information, the terminal device sends a NACK to the network device to notify the network device that it has not received the scheduling information correctly; then, the network device may resend the PDSCH (retransmission of scheduling information) to the terminal device until the terminal receives the PDSCH correctly. In some examples, the slot where the RRC signaling is transmitted for the last time is the slot where the terminal correctly receives the PDSCH carrying the RRC signaling.

In addition, in exemplary scenarios, the first timepoint may also be determined as a downlink transmission slot in which the RRC signaling is located when the RRC signaling is transmitted in any one of multiple retransmissions. For example, it may be the downlink transmission slot when the RRC signaling is retransmitted for the last second time.

There is a difference between the slot in which the RRC signaling is correctly received, the slot in which the terminal device confirms that the RRC signaling is correctly received, and the slot in which the terminal device sends an ACK. In terms of time, the timepoint when the RRC signaling is correctly received is the earliest, the timepoint when the terminal device confirms that the RRC signaling is correctly received is the second, and the slot in which the terminal device sends the ACK is the latest. In some examples, when the terminal device receives the RRC signaling from the network device, upon receiving the RRC signaling (which may have been received correctly at this time), the terminal device confirms whether the RRC signaling is correctly received (as mentioned above, based on a detection result of the PDSCH channel). Thus, when it is confirmed that the RRC signaling is correctly received, the terminal device sends the ACK to the network device. On the contrary, if it is not correctly received, the terminal device sends a NACK to the network device.

In some other examples, the first timepoint is determined according to the slot in which the RRC signaling was transmitted for the last time (the latest transmission of the RRC signaling).

In some examples, considering that the RRC signaling may be retransmitted, the first timepoint is directly determined as the start timepoint of the downlink transmission slot in which the RRC signaling is located during its latest transmission. For example, if the RRC signaling is retransmitted 5 times, the first timepoint is the downlink transmission slot in which the RRC signaling is located when the RRC signaling is transmitted for the fifth time.

In some other examples, the first timepoint is determined according to the slot in which a first uplink transmission resource is located, where the first uplink transmission resource is used for transmitting ACK, and the ACK is used for indicating that the RRC signaling is correctly received.

As mentioned above, when the network device sends scheduling information (specifically, RRC signaling in some examples) to the terminal, the terminal device performs a receipt feedback to the network device based on whether the scheduling information is successfully received. Specifically, if the terminal device successfully receives the scheduling information from the network device, the terminal device sends an ACK to the network device to notify the network device that the scheduling information has been successfully received. Conversely, if the terminal does not successfully receive the scheduling information, the terminal device sends a NACK to the network device to notify the network device that the scheduling information is not correctly received. Accordingly, the network device may resend the scheduling information (retransmission) to the terminal device.

Therefore, in some examples, after the terminal successfully receives the RRC signaling, the uplink transmission slot in which the terminal sends the ACK to the network device is determined as the first timepoint.

For ease of understanding, the first case mentioned above is taken as an example for specific description.

Specifically, in the first case, the target timepoint is associated with the delay parameter Y, the start timepoint (that is, the first timepoint) of the downlink slot in which the RRC signaling is located, and the timing advance TA. In this way, in this type-1 scheduling scheme, the target timepoint can satisfy the following formula:

$$T = T_{DL} - \frac{T_{TA}}{2} + T1$$

Herein, T is the target timepoint, $T_{DL}$ is the start timepoint of the downlink slot, $T_{TA}$ is a second duration obtained according to the timing advance, and T1 is a first duration obtained according to the delay parameter Y.

Herein, $T_{DL}$ is used for indicating the start timepoint of the downlink slot. Based on the different scheduling schemes of SL resources in the communication system, $T_{DL}$ may be used for indicating the start timepoint of the downlink slot in which the RRC signaling is located; or, it may be used for indicating the start timepoint of the downlink slot in which the DCI is located. In the type-1 scheduling scheme, $T_{DL}$ may be used for indicating the start timepoint of the downlink slot in which the RRC signaling is located.

The timing advance TA may be derived from the network device. Exemplarily, the scheduling information received by the terminal may carry TA. Accordingly, the RRC signaling includes but is not limited to TA. In some other examples, the terminal may receive a notification message from the network device, the notification message and the scheduling information are independent of each other, and the notification message carries TA. In some implementation examples, the notification message may be another RRC signaling. The notification message may be sent by the network device to the terminal before, after, or at the same time as the RRC signaling. After receiving the notification message, the terminal stores the TA, until it reaches a validity term of the TA before requesting a new TA from the network device, or until receiving a new TA from the network device.

In some exemplary application scenarios, the TA is used for compensating for the transmission duration. Therefore, in some exemplary application scenarios, the duration to be compensated is also obtained according to the TA. According to some examples of this application, the compensation duration obtained according to the TA is recorded as the second duration. This application has no particular limitation on how to calculate the second duration based on TA. For example, a correspondence between TA and the second duration may be maintained, and the second duration may be determined based on the TA and the correspondence. For another example, TA may also be directly used as the second duration. For still another example, it is also possible to perform a mathematical operation on the TA to obtain the second duration, and the operation mode may be customized.

According to some examples of this application, the delay parameter Y may be derived from the network device or the terminal.

The delay parameter Y may be derived from the terminal. In some examples, the delay parameter is a pre-configured parameter of the terminal. Accordingly, the network device allocates SL transmission resources to the terminal through RRC signaling. After receiving the RRC signaling, the terminal obtains the target timepoint based on the start timepoint $T_{DL}$ of the downlink slot in which the RRC signaling is located, TA, and the delay parameter Y, and then use the first one available slot not earlier than the target timepoint as the start timepoint of SL transmission.

The delay parameter Y may also be derived from the network device. In some examples, the delay parameter is configured by the network device and carried in the scheduling information. That is, when the network device configures the scheduling information of the terminal, the delay parameter may be configured for the terminal. Accordingly, the scheduling information of the terminal is determined, and the delay parameter Y is carried in the scheduling information (RRC signaling). In addition, the delay parameter Y may also be configured by the network device and sent to the terminal by the network device in a manner independent of the scheduling information.

According to some examples of this application, the delay parameter Y is associated with a duration for processing the RRC signaling by the terminal.

After the terminal receives the RRC signaling, it needs to process the RRC signaling, such as decoding and parsing. After the processing is completed, the terminal obtains the specific information carried in the RRC signaling. Different terminals process RRC signaling in at least one of different processing modes and different processing capabilities. Therefore, different terminals have different delays for processing the RRC signaling. For example, the network device sends RRC signaling to terminal 1 and terminal 2 respectively, the processing delay of terminal 1 for processing the RRC signaling is 0.5 ms, and the processing delay of terminal 2 for processing the RRC signaling is 0.35 ms.

Accordingly, in some examples of this application, the first duration is determined according to the delay parameter Y, and the first duration may be greater than or equal to the processing delay of the terminal for the RRC signaling. It should be noted that different terminals have different processing delays for processing RRC signaling, but their delay parameters Y may be the same or different. For example, in the foregoing example, the first duration indicated by the delay parameter Y of the terminal 1 may be 0.5 ms, and the first duration indicated by the delay parameter Y of the terminal 2 may also be 0.5 ms, both are the same.

According to some examples of this application, when the first duration is determined according to the delay parameter, it may include, but is not limited to, the following implementation manners.

In some examples, the first duration is the delay parameter Y, that is, the value of the delay parameter Y is used for indicating the time length of the first duration.

In some other examples, the delay parameter Y is the number of slots. In this case, the first duration T1 is the product of the delay parameter Y and the duration $T_{slot}$ of the unit slot. Specifically, the unit slot duration $T_{slot}$ may be based on the subcarrier spacing of the SL.

In some other examples, the delay parameter Y is a time length corresponding to one slot, which is a slot determined based on the subcarrier spacing of the SL, or a slot determined based on the subcarrier spacing of the uplink.

In some other examples, the delay parameter is first index information. In this case, the first duration T1 may be obtained through the first index information and a preset first correspondence, and the first correspondence indicates a mapping relationship between the first index information and duration(s).

Figure 8:
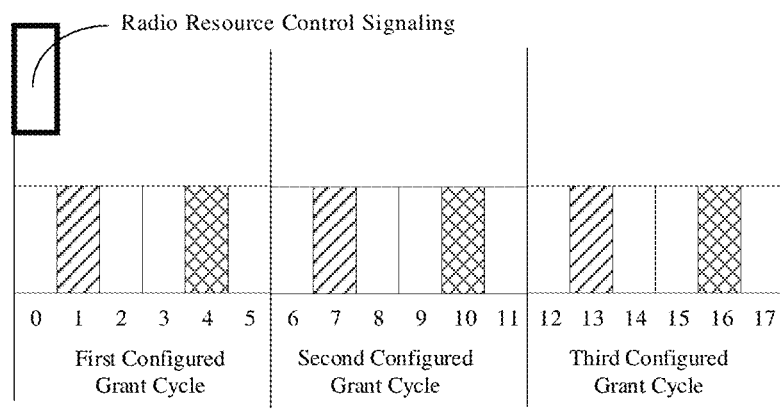
FIG. 8 is a schematic diagram of a SL transmission mode based on the type-1 scheduling according to some examples of the application.

Exemplarily, FIG. 8 illustrates a schematic diagram of a SL transmission mode based on the type-1 scheduling scheme. FIG. 8 illustrates the type-1 SL configured grant transmission resources configured by the network device for the terminal through RRC signaling, where each configured grant period includes 6 slots (or subframes). In these 18 slots, the SL resource pool includes 6 slots in total, namely, slot 1, slot 4, slot 7, slot 10, slot 13, and slot 16. However, the configured grant resources allocated by the network device to the terminal include only three slots in the resource pool, namely, slot 1, slot 7 and slot 13. Accordingly, slot 1, slot 7 and slot 13 are available resources in the resource pool.

Following examples are described based on the scenario shown in FIG. 8.

For example, the terminal receives RRC signaling from the network device in slot 0, and the RRC signaling carries the delay parameter Y, and a value of Y is 4. When the terminal is in the RRC-idle state, TA is 0, so it is determined that the target timepoint corresponds to slot 4. However, slot 4 is not an available resource in the resource pool, and the first available resource that is not earlier than slot 4 is slot 7. Then, the terminal determines that the start timepoint of SL transmission is slot 7.

For another example, the terminal receives RRC signaling from the network device in slot 0, TA is 0, the processing delay for the terminal to process RRC signaling is 0.5 ms, and the SL subcarrier spacing is 15 kHz, so the unit slot duration is determined as 1 ms. Then, the target timepoint is determined as 0.5 ms, which corresponds to slot 1. Slot 1 is an available resource in the resource pool. Therefore, slot 1 is determined as the start timepoint of SL transmission.

For still another example, the terminal receives RRC signaling from the network device in slot 0, TA is 0, the processing delay for the terminal to process RRC signaling is 2 ms, and the SL subcarrier spacing is 15 kHz, so the unit slot duration is determined as 1 ms. Then, the target timepoint is determined as 2 ms, which corresponds to slot 2. Then, in the resource pool, the first one available resource not earlier than slot 2 is slot 7, and slot 7 is determined as the start timepoint of SL transmission.

In addition to the foregoing examples, in the type-1 scheduling scheme, the delay parameter Y may also be zero. Accordingly, the target timepoint is associated with the time-related parameter and the timing advance TA. In some examples, the time-related parameter is the second timepoint determined according to RRC signaling.

The second timepoint is determined based on the RRC signaling, and the determination manner is similar to the foregoing determination manner of the first timepoint. Accordingly, the second timepoint may include but is not limited to the following situations.

In some examples, the second timepoint is determined according to the slot in which the RRC signaling is located.

Exemplarily, the second timepoint is the downlink slot in which the RRC signaling is transmitted for the first time; or, it is the downlink slot in which the RRC signaling is transmitted for the last time.

Exemplarily, the second timepoint is determined according to the timepoint when the RRC signaling is correctly received.

Exemplarily, the second timepoint is determined according to the timepoint when the terminal confirms that the RRC signaling is correctly received.

In some other examples, the second timepoint is determined according to the slot in which the RRC signaling is transmitted for the last time.

In some other examples, the second timepoint is determined according to the second uplink transmission resource, where the second uplink transmission resource is used for transmitting an ACK, and the ACK is used for indicating that the RRC signaling is correctly received.

Details will be not repeated here.

In the cross-RAT scheduling scheme, a structure of the communication system may refer to FIG. 4, the network device is an NR network device, and the SL transmission resources are LTE SL transmission resources. Details will be not repeated here.

In the cross-RAT scheduling scheme, the scheduling information is DCI. In this scenario, the time-related parameters involved according to some examples of this application may include, but are not limited to, a time offset parameter and a slot offset parameter.

In some examples, the slot offset parameter, or referred to as SL index, is used for determining the slot offset m in the time division duplex (TDD) system. In other words, m exists in the TDD system, but does not exist or is configured as 0 in the frequency division duplex (FDD) system.

In some examples, the time offset parameter, or referred to as TimeOffsetLTESL, is used for determining the third duration (for ease of description, it is referred to as X). According to some examples of this application, the third duration X is associated with the interaction duration of the scheduling information between different modules in the terminal device.

Specifically, as shown in FIG. 4, in the cross-RAT scheduling scheme, the terminal side receives the DCI from the network device through an NR module, and the SL to be scheduled is implemented through an LTE module. Accordingly, there will be a certain delay caused by interaction of the signaling between the NR module and the LTE module. Therefore, when determining the SL transmission timepoint, the interaction duration of signaling between different modules is to be considered. In some examples of this application, the third duration is used for compensating for the interaction duration. In some implementation examples, the third duration X is greater than or equal to the interaction duration.

The interaction delays between modules in different terminals may be different. The third durations corresponding to different terminals may also be different.

In some examples, in addition to the interaction delay between the modules, the third duration is also associated with the processing capability of the terminal. In some examples, the terminal reports information associated with its own processing capability to the network device, so that the network device considers the processing capability of the terminal when performing cross-RAT scheduling.

Specifically, in the cross-RAT scheduling scheme, the target timepoint is associated with the time offset parameter TimeOffsetLTESL, the slot offset parameter SL index, the start timepoint $T_{DL}$ of the downlink slot in which the DCI is located, and the timing advance TA.

Further, in the cross-RAT scheduling scheme, the target timepoint may satisfy the following formula:

$$T = T_{DL} - \frac{N_{TA}}{2} \times T_S + (4 + m + X) \times 10^{-3}$$

Herein, T is the target timepoint, $T_{DL}$ is the start timepoint of the downlink slot, $N_{TA}$ is the number of time units obtained according to the timing advance, $T_S$ is the time unit, m is the slot offset obtained according to the slot offset parameter, and X is the third duration obtained according to the time offset parameter. In the cross-RAT scheduling scheme, $T_{DL}$ is specifically used for indicating the start timepoint of the downlink slot in which the DCI is located.

In some examples, $T_S$ satisfies: $T_S=1/(15000\times2048)$ second. Alternatively, if the unit of the third duration X is milliseconds, the formula may be transformed into:

$$T = T_{DL} - \frac{N_{TA}}{2} \times T_S + (4 + m) \times 10^{-3} + X$$

The meaning of each parameter in this formula is the same as above, and will not be repeated here.

In the cross-RAT scheduling scheme, the time offset parameter may be configured by the network device and sent by the network device to the terminal. In some examples, the time offset parameter is configured by the network device and carried in the scheduling information. In some examples, when the network device determines the scheduling information, the time offset parameter is configured for the terminal, thereby determining the scheduling information of the terminal, and the scheduling information (DCI) carries the time offset parameter (TimeOffsetLTESL). In addition, in some other examples, the time offset parameter may be sent through another message different from the scheduling information.

According to some examples of this application, the time offset parameter is the third duration configured by the network device. As mentioned above, the third duration may be configured by the network device based on the processing capability of the terminal, or may be a pre-configured parameter of the network device.

Alternatively, the time offset parameter may also be an index value. In some examples, the time offset parameter is second index information, the third duration is obtained through the second index information and a preset second correspondence, and the second correspondence indicates a mapping relationship between the second index information and duration(s) configured by the network device.

Figure 9:
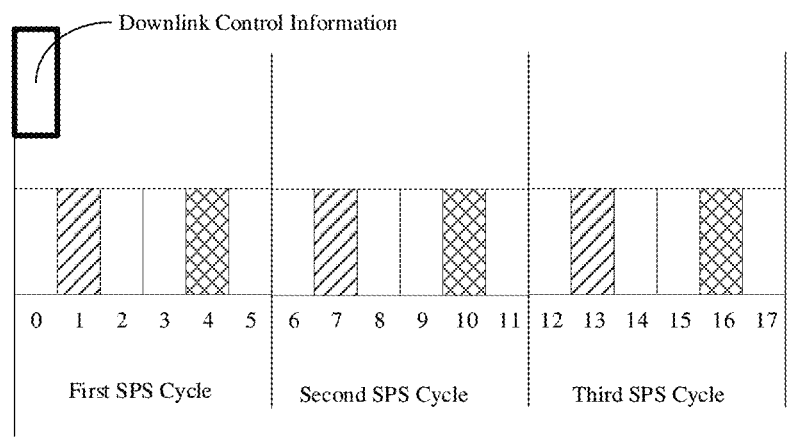
FIG. 9 is a schematic diagram of a SL transmission mode based on the cross-RAT scheduling according to some examples of this application.

Exemplarily, FIG. 9 illustrates a schematic diagram of a SL transmission mode based on the cross-RAT scheduling. In the transmission resources shown in FIG. 9, there are a total of 3 semi-persistent scheduling (SPS) cycles, and each cycle includes 6 slots (or subframes). In these 18 slots, the SL resource pool includes 6 slots in total, namely, slot 1, slot 4, slot 7, slot 10, slot 13, and slot 16. However, the configured grant resources allocated by the network device to the terminal include only three slots in the resource pool, namely, slot 1, slot 7 and slot 13. Accordingly, slot 1, slot 7 and slot 13 are available resources in the resource pool.

Following examples are described based on the scenario shown in FIG. 9.

For example, the terminal receives DCI from the network device in slot 0, and the DCI carries TimeOffsetLTESL and SL index, where the third duration X indicated by TimeOffsetLTESL is 4, the slot offset m indicated by SL index is 2, and $N_{TA}=0$. Accordingly, the target timepoint corresponds to slot 10, but slot 10 is not an available resource in the resource pool. Therefore, the terminal device determines the first available resource after slot 10, that is, slot 13 as the start timepoint of SL transmission.

For another example, the terminal receives DCI from the network device in slot 0, and the DCI carries TimeOffsetLTESL and SL index, where the third duration X indicated by TimeOffsetLTESL is 4, the slot offset m indicated by SL index is 0, and $N_{TA}=0$. Accordingly, the target timepoint corresponds to slot 8. Therefore, the terminal device determines the first available resource after slot 8, that is, slot 13 as the start timepoint of SL transmission.

In view of above, based on the method for configuring SL transmission resource according to some examples of this application, the terminal device receives scheduling information from the network device, and the scheduling information is used for scheduling the SL transmission resource of the terminal device. In some examples of this application, the scheduling information is sent by the network device in the type-1 mode, or sent by the network device based on the cross-RAT. The terminal device can determine the target timepoint associated with a time-related parameter according to the scheduling information or the time-related parameter of the terminal as pre-configured, so as to select the first one available resource not earlier than the target timepoint in the resource pool as the SL transmission timepoint (that is, the start timepoint of SL transmission). In this way, based on the technical solution according to some examples of this application, the SL transmission timepoint can be determined for the scheduling information sent by the network according to type-1 mode or cross-RAT, thereby overcoming the deficiency of determining the SL transmission timepoint in the related art, as well as improving stability and flexibility of the transmission procedure.

Figure 10:
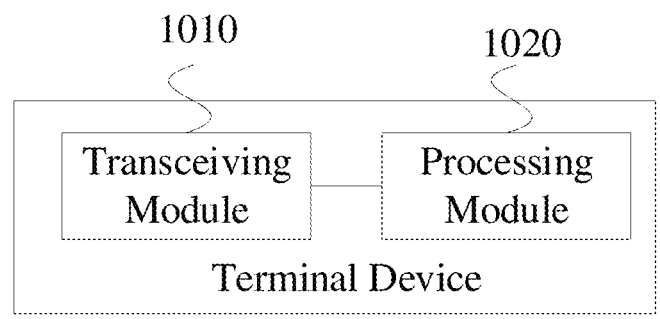
FIG. 10 is a block diagram of a terminal device according to some examples of this application.

FIG. 10 is a block diagram of the terminal device according to this application. As shown in FIG. 10, the terminal device includes a transceiving module 1010 and a processing module 1020, where the transceiver module 1010 is configured to receive scheduling information from a network device, the scheduling information is used for configuring a SL transmission resource of the terminal device; and the processing module 1020 is configured to obtain a start timepoint of a SL transmission of the terminal device, where the start timepoint is a first one available resource in a resource pool not earlier than a target timepoint. The target timepoint is associated with a time-related parameter, and the time-related parameter is derived from the terminal device or is determined according to the scheduling information.

The terminal provided in some examples is configured to implement the technical solution at the terminal side according to any of the foregoing method examples, and its implementation principles and technical effects are similar, and will not be repeated here.

Optionally, the scheduling information is an RRC signaling, and the RRC signaling is used for configuring a first type of SL configured grant; the time-related parameter includes a delay parameter, and the delay parameter is used for indicating a first duration.

Optionally, the target timepoint is associated with the delay parameter, a first timepoint, and a timing advance, where the first timepoint is determined according to the RRC signaling.

Optionally, the first timepoint is determined according to a slot in which the RRC signaling is located.

Optionally, the first timepoint is determined according to a slot in which a latest transmission of the RRC signaling is located.

Optionally, the first timepoint is determined according to a slot in which a first uplink transmission resource is located, the first uplink transmission resource is used for transmitting an ACK, and the ACK is used for indicating the RRC signaling is correctly received.

Optionally, the target timepoint is associated with the delay parameter, a start timepoint of a downlink slot in which the RRC signaling is located, and a timing advance.

Optionally, the target timepoint satisfies a following formula:

$$T = T_{DL} - \frac{T_{TA}}{2} + T1$$

Herein, T is the target timepoint, $T_{DL}$ is the start timepoint of the downlink slot, $T_{TA}$ is a second duration obtained according to the timing advance, and T1 is the first duration obtained according to the delay parameter.

Optionally, the delay parameter is a pre-configured parameter of the terminal device.

Optionally, the delay parameter is configured by the network device and carried in the scheduling information.

Optionally, the delay parameter is associated with a processing duration of the terminal device for the RRC signaling.

Optionally, the first duration is the delay parameter; or, the delay parameter is a number of slots, and the first duration is a product of the number of slots and a duration of one slot; or, the delay parameter is first index information, the first duration is obtained through the first index information and a preset first correspondence, and the first correspondence is a correspondence between the first index information and the duration.

Optionally, the scheduling information is an RRC signaling, and the RRC signaling is used for configuring a first type of SL configured grant;

the time-related parameter is a second timepoint determined according to the RRC signaling.

Optionally, the second timepoint is determined according to a slot in which the RRC signaling is located.

Optionally, the second timepoint is determined according to a slot in which a latest transmission of the RRC signaling is located.

Optionally, the second timepoint is determined according to a second uplink transmission resource, the second uplink transmission resource is used for transmitting an ACK, and the ACK is used for indicating the RRC signaling is correctly received.

Optionally, the target timepoint is associated with the second timepoint and a timing advance.

Optionally, when the terminal device is in communication with the network device through Cross-RAT, the scheduling information is a DCI, and the DCI is used for activating the SL transmission resource; where the network device is an NR network device, and the SL transmission resource is an LTE SL transmission resource.

Optionally, the time-related parameter includes: a time offset parameter, used for determining a third duration, where the third duration is associated with an interaction duration of the scheduling information between different modules in the terminal device; and a slot offset parameter, used for determining a slot offset in a TDD system.

Optionally, the target timepoint is associated with the time offset parameter, the slot offset parameter, a start timepoint of a downlink slot in which the DCI is located, and a timing advance.

Optionally, the target timepoint satisfies the following formula:

$$T = T_{DL} - \frac{N_{TA}}{2} \times T_S + (4 + m + X) \times 10^{-3}$$

-continued or, $$T = T_{DL} - \frac{N_{TA}}{2} \times T_S + (4+m) \times 10^{-3} + X$$

Herein, T is the target timepoint, $T_{DL}$ is the start timepoint of the downlink slot, $N_{TA}$ is a number of time units obtained according to the timing advance, $T_S$ is the time unit, m is the slot offset obtained according to the slot offset parameter, and X is the third duration obtained according to the time offset parameter.

Optionally, the time offset parameter is second index information, the third duration is obtained through the second index information and a preset second correspondence, and the second correspondence is a correspondence between the second index information and the duration configured by the network device.

Optionally, the time offset parameter is configured by the network device and carried in the scheduling information.

Figure 11:
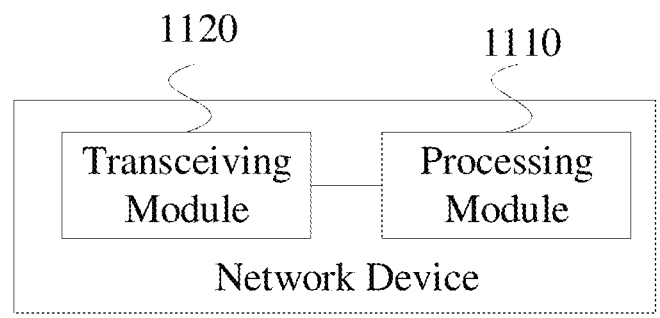
FIG. 11 is a block diagram of a network device according to some examples of this application.

FIG. 11 is a block diagram of the network device according to this application. As shown in FIG. 11, the network device includes a processing module 1110 and a transceiving module 1120; where the processing module 1110 is configured to determine scheduling information of a terminal, the scheduling information is configured to send the scheduling information to the terminal, causing the terminal to obtain a start timepoint of a SL transmission of the terminal, where the start timepoint is a first one available resource in a resource pool not earlier than a target timepoint. The target timepoint is associated with a time-related parameter, and the time-related parameter is derived from the terminal or is determined according to the scheduling information.

The network device provided in some examples is configured to implement the technical solution at the network device side according to any of the foregoing method examples, and its implementation principles and technical effects are similar, and will not be repeated here.

Optionally, the scheduling information is an RRC signaling, and the RRC signaling is used for configuring a first type of SL configured grant; the time-related parameter includes a delay parameter, and the delay parameter is used for indicating a first duration.

Optionally, the target timepoint is associated with the delay parameter, a first timepoint, and a timing advance, where the first timepoint is determined according to the RRC signaling.

Optionally, the first timepoint is determined according to a slot in which the RRC signaling is located.

Exemplarily, the first timepoint is the downlink slot in which the RRC signaling is transmitted for the first time; or, it is the downlink slot in which the RRC signaling is transmitted for the last time.

Exemplarily, the first timepoint is determined according to the timepoint when the RRC signaling is correctly received.

Exemplarily, the first timepoint is determined according to the timepoint when the terminal confirms that the RRC signaling is correctly received.

Optionally, the first timepoint is determined according to a slot in which a latest transmission of the RRC signaling is located.

Optionally, the first timepoint is determined according to a slot in which a first uplink transmission resource is located, the first uplink transmission resource is used for transmitting an ACK, and the ACK is used for indicating the RRC signaling is correctly received.

Optionally, the target timepoint is associated with the delay parameter, a start timepoint of a downlink slot in which the RRC signaling is located, and a timing advance.

Optionally, the target timepoint satisfies the following formula:

$$T = T_{DL} - \frac{T_{TA}}{2} + T1$$

Herein, T is the target timepoint, $T_{DL}$ is the start timepoint of the downlink slot, $T_{TA}$ is a second duration obtained according to the timing advance, and T1 is the first duration obtained according to the delay parameter.

Optionally, the delay parameter is a pre-configured parameter of the terminal.

Optionally, the processing module 1110 is specifically configured to: configure the delay parameter for the terminal; and determine the scheduling information of the terminal, where the scheduling information carries the delay parameter.

Optionally, the delay parameter is associated with a processing duration of the terminal for the RRC signaling.

Optionally, the first duration is the delay parameter; or, the delay parameter is a number of slots, and the first duration is a product of the number of slots and a duration of one slot; or, the delay parameter is first index information, the first duration is obtained through the first index information and a preset first correspondence, and the first correspondence is a correspondence between the first index information and the duration.

Optionally, the scheduling information is an RRC signaling, and the RRC signaling is used for configuring a first type of SL configured grant;

the time-related parameter is a second timepoint determined according to the RRC signaling.

Optionally, the second timepoint is determined according to a slot in which the RRC signaling is located.

Exemplarily, the second timepoint is the downlink slot where the RRC signaling is transmitted for the first time; or, it is the downlink slot where the RRC signaling is transmitted for the last time.

Exemplarily, the second timepoint is determined according to the timepoint when the RRC signaling is correctly received.

Exemplarily, the second timepoint is determined according to the timepoint when the terminal confirms that the RRC signaling is correctly received.

Optionally, the second timepoint is determined according to a slot in which a latest transmission of the RRC signaling is located.

Optionally, the second timepoint is determined according to a second uplink transmission resource, the second uplink transmission resource is used for transmitting an ACK, and the ACK is used for indicating the RRC signaling is correctly received.

Optionally, the target timepoint is associated with the second timepoint and the timing advance.

Optionally, when the network device is in communication with the terminal through Cross-RAT, the scheduling information is a DCI, and the DCI is used for activating the SL transmission resource; where the network device is an NR network device, and the SL transmission resource is an LTE SL transmission resource.

Optionally, the time-related parameters include: a time offset parameter, used for determining a third duration, where the third duration is associated with an interaction duration of the scheduling information between different modules in the terminal; and a slot offset parameter, used for determining a slot offset in a TDD system.

Optionally, the target timepoint is associated with the time offset parameter, the slot offset parameter, a start timepoint of a downlink slot in which the DCI is located, and a timing advance.

Optionally, the target timepoint satisfies the following formula:

$$T = T_{DL} - \frac{N_{TA}}{2} \times T_S + (4 + m + X) \times 10^{-3}$$

or, $$T = T_{DL} - \frac{N_{TA}}{2} \times T_S + (4 + m) \times 10^{-3} + X$$

Herein, T is the target timepoint, $T_{DL}$ is the start timepoint of the downlink slot, $N_{TA}$ is a number of time units obtained according to the timing advance, $T_S$ is the time unit, m is the slot offset obtained according to the slot offset parameter, and X is the third duration obtained according to the time offset parameter.

Optionally, the time offset parameter is second index information, the third duration is obtained through the second index information and a preset second correspondence, and the second correspondence is a correspondence between the second index information and the duration configured by the network device.

Optionally, the processing module 1110 is specifically configured to configure the time offset parameter for the terminal; and determine the scheduling information of the terminal, where the scheduling information carries the time offset parameter.

Figure 12:
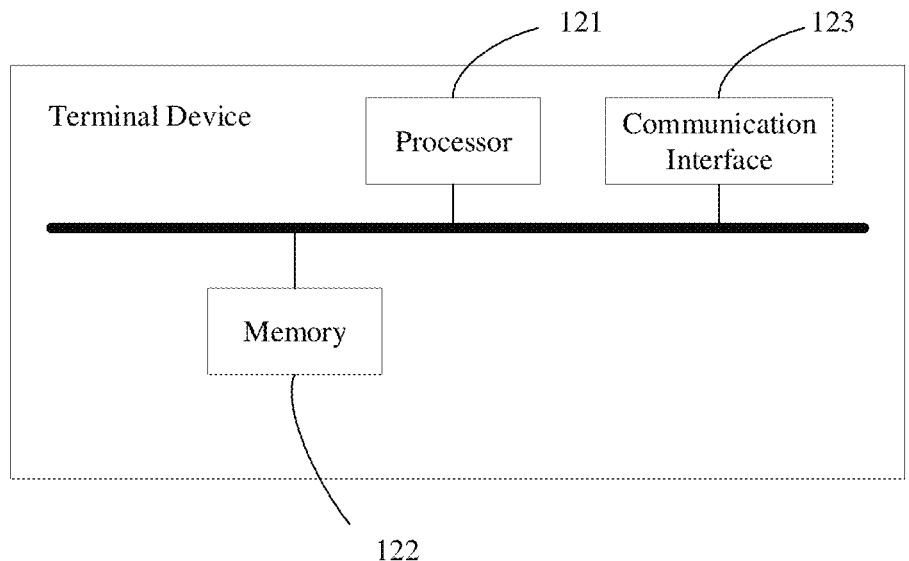
FIG. 12 is a block diagram of another terminal device according to some examples of this application.

FIG. 12 is a block diagram of another terminal device according to this application. As shown in FIG. 12, the terminal device includes:

a processor 121, a memory 122, and a communication interface 123.

The memory 122 stores computer-executable instructions.

The processor 121 executes the computer-executable instructions stored in the memory 122, so that the processor 121 implements the technical solution at the terminal side according to any of the foregoing method examples.

FIG. 12 illustrates a simple design of the terminal device. The example of this application does not limit the number of processors and memories in the terminal device. FIG. 12 only takes the number of one as an example for illustration.

Figure 13:
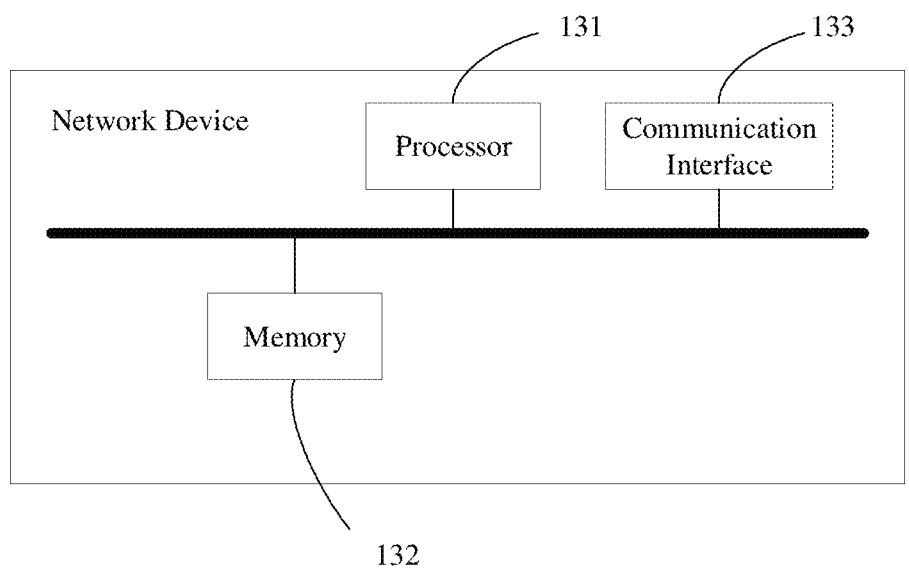
FIG. 13 is a block diagram of another network device according to some examples of this application.

FIG. 13 is a block diagram of another network device according to this application. As shown in FIG. 13, the network device includes:

a processor 131, a memory 132, and a communication interface 133.

The memory 132 stores computer-executable instructions.

The processor 131 executes the computer-executable instructions stored in the memory 132, so that the processor 131 implements the technical solution at the network device side according to any of the foregoing method examples.

FIG. 13 illustrates a simple design of the network device. The example of this application does not limit the number of processors and memories in the network device. FIG. 13 only takes the number of one as an example for illustration.

In some implementation examples of the terminal shown in FIG. 12 or the network device in FIG. 13, the memory, the processor, and the communication interface may be connected via a bus. Optionally, the memory may be integrated within the processor.

Examples of this application also provide a communication system. As shown in FIG. 1, the communication system 100 includes a terminal and a network device, where the terminal device 120 is configured to implement the technical solution at the terminal side according to any of the foregoing method examples, and the network device 110 is configured to execute the technical solution at the network device side according to any of the foregoing method examples.

Examples of this application also provide a computer-readable storage medium. The computer-readable storage medium stores computer-executable instructions. When the computer-executable instructions are executed by a processor, they are used for implementing the method for configuring SL transmission resources according to any of the foregoing method examples.

Examples of this application also provide a chip, including a processor configured to call and run a computer program from a memory, thereby causing a device installed with the chip to implement the method for configuring SL transmission resources according to any of the foregoing method examples.

Examples of this application also provide a computer program product including computer program instructions, which cause a computer to implement the method for configuring SL transmission resources according to any of the foregoing method examples.

Examples of this application also provide a computer program that enables a computer to implement the method for configuring SL transmission resources according to any of the foregoing method examples.

In the several examples provided in this application, it should be understood that the disclosed device and method may be implemented in other ways. For example, the device examples described above are only illustrative. For example, the division of the modules is only a logical function division, and there may be other divisions in actual implementation, for example, multiple modules may be combined or integrated with another system, or some features may be ignored or not implemented. In addition, the displayed or discussed mutual coupling or direct coupling or communication connection may be through some interfaces. The indirect coupling or communication connection of the modules may be in electrical, mechanical or other forms.

In the implementation examples of the above terminal device and network device, it should be understood that the processor may be a central processing unit (CPU), or another general-purpose processor, digital signal processor (DSP), application specific integrated circuit (ASIC), and the like. The general-purpose processor may be a microprocessor or the processor may also be any conventional processor or the like. The steps in the method disclosed in this application may be directly embodied as being executed and completed by a hardware processor, or executed and completed by a combination of hardware and software modules in the processor.

All or part of the steps in the foregoing method examples may be implemented by a program instructing relevant hardware. The aforementioned program may be stored in a readable memory. When the program is executed, it is used for implementing the steps of the above-mentioned method examples; and the aforementioned memory (storage medium) includes: read-only memory (ROM), RAM, flash

What is claimed is:

1. A method for configuring sidelink (SL) transmission resource, comprising:
receiving scheduling information from a network device, wherein the scheduling information is used for configuring the SL transmission resource of a terminal; and
obtaining a start timepoint of a SL transmission of the terminal, wherein the start timepoint is a first one available resource in a resource pool not earlier than a target timepoint;
wherein, the target timepoint is associated with a time-related parameter, and the time-related parameter is derived from the terminal or is determined according to the scheduling information,
wherein when the terminal is in communication with the network device through cross-radio access technology (Cross-RAT), the scheduling information is a downlink control information (DCI), and the DCI is used for activating the SL transmission resource;
wherein the network device is a new radio (NR) network device, and the SL transmission resource is a long-term evolution (LTE) SL transmission resource; and
wherein the time-related parameter comprises:
a time offset parameter, used for determining a third duration, wherein the third duration is associated with an interaction duration of the scheduling information between different modules in the terminal; and
a slot offset parameter, used for determining a slot offset in a time division duplex (TDD) system.

2. The method as claimed in claim 1, wherein the target timepoint is associated with the time offset parameter, the slot offset parameter, a start timepoint of a downlink slot in which the DCI is located, and a timing advance; and
the target timepoint satisfies a following formula:

$$T = T_{DL} - \frac{N_{TA}}{2} \times T_S + (4 + m + X) \times 10^{-3}$$

where T is the target timepoint, $T_{DL}$ is the start timepoint of the downlink slot, $N_{TA}$ is a number of time units obtained according to the timing advance, $T_S$ is the time unit, m is the slot offset obtained according to the slot offset parameter, and X is the third duration obtained according to the time offset parameter.

3. The method as claimed in claim 1, wherein the time offset parameter is configured by the network device and carried in the scheduling information.

4. A method for configuring sidelink (SL) transmission resource, comprising:
determining scheduling information of a terminal, wherein the scheduling information is used for configuring the SL transmission resource of the terminal; and
sending the scheduling information to the terminal, causing the terminal to obtain a start timepoint of a SL transmission of the terminal, wherein the start timepoint is a first one available resource in a resource pool not earlier than a target timepoint;
wherein, the target timepoint is associated with a time-related parameter, and the time-related parameter is derived from the terminal or is determined according to the scheduling information,
wherein when the terminal is in communication with the network device through cross-radio access technology (Cross-RAT), the scheduling information is a downlink control information (DCI), and the DCI is used for activating the SL transmission resource;
wherein the network device is a new radio (NR) network device, and the SL transmission resource is a long-term evolution (LTE) SL transmission resource; and
wherein the time-related parameter comprises:
a time offset parameter, used for determining a third duration, wherein the third duration is associated with an interaction duration of the scheduling information between different modules in the terminal; and
a slot offset parameter, used for determining a slot offset in a time division duplex (TDD) system.

5. The method as claimed in claim 4, wherein the target timepoint is associated with the time offset parameter, the slot offset parameter, a start timepoint of a downlink slot in which a downlink control information (DCI) is located, and a timing advance; and
the target timepoint satisfies a following formula:

$$T = T_{DL} - \frac{N_{TA}}{2} \times T_S + (4 + m + X) \times 10^{-3}$$

where T is the target timepoint, $T_{DL}$ is the start timepoint of the downlink slot, $N_{TA}$ is a number of time units obtained according to the timing advance, $T_S$ is the time unit, m is the slot offset obtained according to the slot offset parameter, and X is the third duration obtained according to the time offset parameter.

6. The method as claimed in claim 4, wherein determining the scheduling information of the terminal comprises:
configuring the time offset parameter for the terminal; and
determining the scheduling information of the terminal, wherein the scheduling information carries the time offset parameter.

7. A terminal device, comprising: a processor, a memory and a transceiver; wherein, the memory is configured to store computer-executable instructions;
the transceiver is configured to receive scheduling information from a network device, wherein the scheduling information is used for configuring a sidelink (SL) transmission resource of the terminal device; and
the processor is configured to obtain a start timepoint of a SL transmission of the terminal device, wherein the start timepoint is a first one available resource in a resource pool not earlier than a target timepoint;
wherein, the target timepoint is associated with a time-related parameter, and the time-related parameter is derived from the terminal device or is determined according to the scheduling information,
wherein when the terminal is in communication with the network device through cross-radio access technology (Cross-RAT), the scheduling information is a downlink control information (DCI), and the DCI is used for activating the SL transmission resource;
wherein the network device is a new radio (NR) network device, and the SL transmission resource is a long-term evolution (LTE) SL transmission resource; and
wherein the time-related parameter comprises:
a time offset parameter, used for determining a third duration, wherein the third duration is associated with an interaction duration of the scheduling information between different modules in the terminal; and a slot offset parameter, used for determining a slot offset in a time division duplex TDD) system.

8. The terminal device as claimed in claim 7, wherein the target timepoint is associated with the time offset parameter, the slot offset parameter, a start timepoint of a downlink slot in which the DCI is located, and a timing advance; and the target timepoint satisfies a following formula:

$$T = T_{DL} - \frac{N_{TA}}{2} \times T_S + (4 + m + X) \times 10^{-3}$$

where T is the target timepoint, $T_{DL}$ is the start timepoint of the downlink slot, $N_{TA}$ is a number of time units obtained according to the timing advance, $T_S$ is the time unit, m is the slot offset obtained according to the slot offset parameter, and X is the third duration obtained according to the time offset parameter.

9. The terminal device as claimed in claim 7, wherein the time offset parameter is configured by the network device and carried in the scheduling information.

* * * * *